(12) United States Patent
Ai et al.

(10) Patent No.: US 7,494,440 B2
(45) Date of Patent: Feb. 24, 2009

(54) STEERING WHEEL MOUNTING ASSEMBLY

(75) Inventors: Xiaolan Ai, Massillon, OH (US); David A. Degrange, Massillon, OH (US)

(73) Assignee: Timken US Corporation, Torrington, CT (US)

( * ) Notice: Subject to any disclaimer, the term of this patent is extended or adjusted under 35 U.S.C. 154(b) by 392 days.

(21) Appl. No.: 10/591,011

(22) PCT Filed: Mar. 24, 2005

(86) PCT No.: PCT/US2005/009856

§ 371 (c)(1),
(2), (4) Date: Aug. 29, 2006

(87) PCT Pub. No.: WO2005/094527

PCT Pub. Date: Oct. 13, 2005

(65) Prior Publication Data

US 2008/0146395 A1      Jun. 19, 2008

Related U.S. Application Data

(60) Provisional application No. 60/556,350, filed on Mar. 25, 2004.

(51) Int. Cl.
*F16H 13/06*      (2006.01)
(52) U.S. Cl. .................................................... 475/183
(58) Field of Classification Search ................. 475/183; 280/731, 728.2
See application file for complete search history.

(56) References Cited

U.S. PATENT DOCUMENTS

| 3,543,874 | A | * | 12/1970 | Nevett | ........................... | 180/78 |
| 4,602,523 | A | | 7/1986 | Kurata et al. | | |
| 4,771,650 | A | * | 9/1988 | Kerner | ......................... | 74/498 |
| 4,796,482 | A | | 1/1989 | Hiramitsu | | |

(Continued)

FOREIGN PATENT DOCUMENTS

DE           3011814         10/1981

(Continued)

OTHER PUBLICATIONS

International Search Report and Written Opinion issued on Dec. 19, 2006, for corresponding International Application No. PCT/US2005/009856.

*Primary Examiner*—Dirk Wright
(74) *Attorney, Agent, or Firm*—Michael Best & Friedrich LLP

(57) ABSTRACT

A steering wheel mounting assembly comprising a stationary support carrier, first and second drive rings, and a drive roller assembly. The stationary support carrier defines first and second ring receiving areas. The first drive ring has a first cylindrical raceway, is supported in the first ring receiving area, and is adapted for connection to a steering wheel. The second drive ring has a second cylindrical raceway, is positioned in the second ring receiving area, and is adapted for connection to a steering shaft. The drive roller assembly is supported within the first and second cylindrical raceways and comprises first and second roller planets, a sun roller supported in frictional engagement with the first and second roller planets, a first loading planet frictionally positioned between the sun roller and the first cylindrical raceway, and a second loading planet frictionally positioned between the sun roller and the second cylindrical raceway.

20 Claims, 10 Drawing Sheets

U.S. PATENT DOCUMENTS

| | | |
|---|---|---|
| 5,072,628 A | 12/1991 | Oki |
| 6,145,402 A | 11/2000 | Nishitani et al. |
| 2008/0236328 A1 * | 10/2008 | Ai et al. .................. 74/552 |

FOREIGN PATENT DOCUMENTS

| | | |
|---|---|---|
| DE | 3534397 | 3/1986 |
| JP | 6067712 | 8/1994 |

* cited by examiner

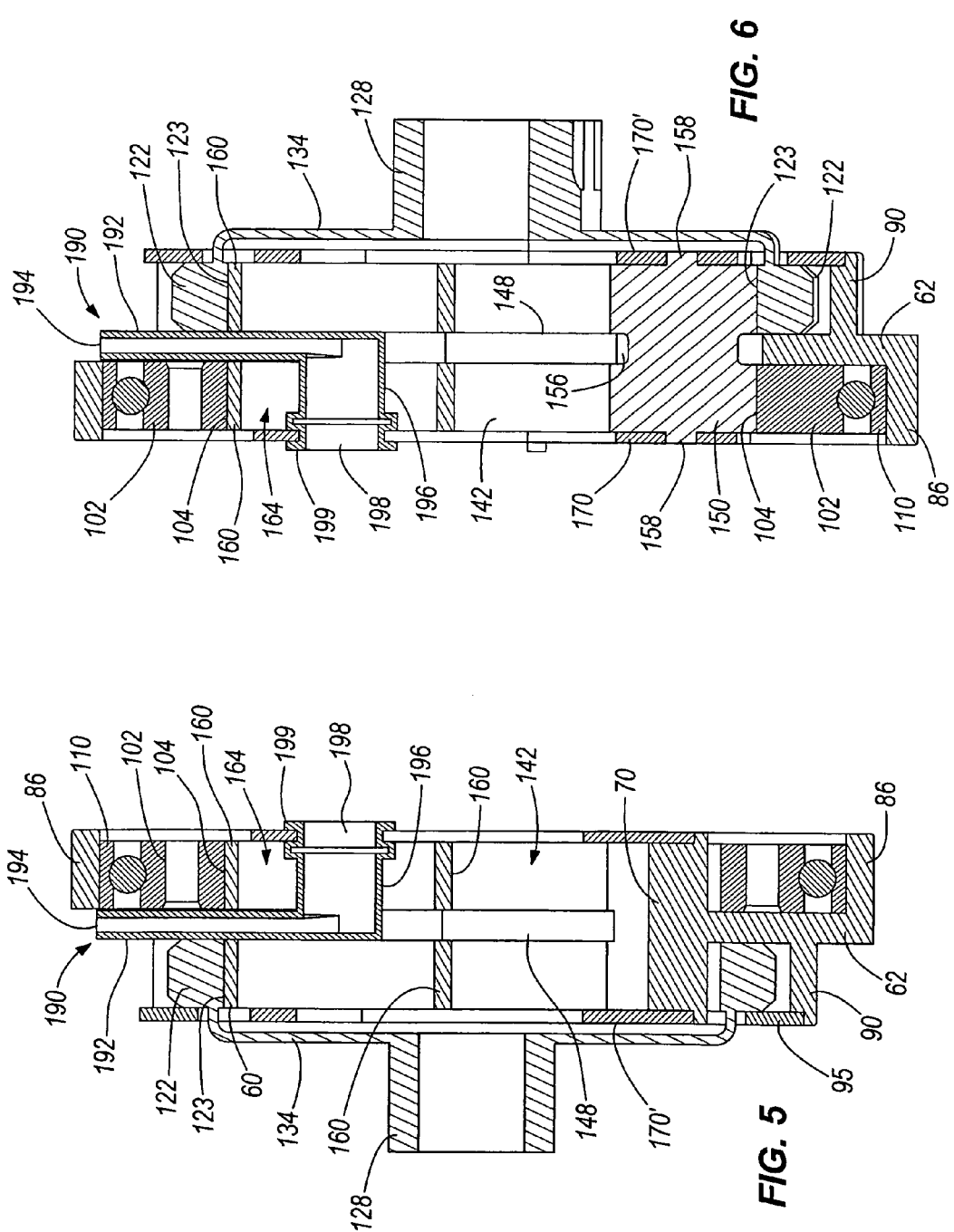

STEERING WHEEL MOUNTING ASSEMBLY

RELATED APPLICATIONS

This application is a 371 of PCT/US2005/009856 filed Mar. 24, 2005, which claims the benefit of U.S. Provisional Patent Application 60/556,350 filed Mar. 25, 2004.

BACKGROUND

The present invention relates to a steering assembly. More particularly, the present invention relates to a steering assembly having a static hub with a steering wheel rotatable thereabout.

Referring to FIG. 1, a prior art steering assembly 10 is shown. The steering assembly 10 includes a steering wheel 12 mounted on a radial frame 14. The radial frame 14 includes a central hub 16 that is mounted on a steering column 18. Rotation of the steering wheel 12 is translated through the frame 14, and thereby the hub 16, to cause rotation of the steering column 18.

A mounting frame 20 is attached to and rotates with the radial frame 14. The mounting frame 20 is configured to support an air bag assembly 22 and other components. The air bag assembly 22 is fixed to the mounting frame 20, and therefore, rotates with the steering wheel 12. Since the orientation of the air bag assembly 22 continuously changes with rotation of the steering wheel 12, the air bag assembly 22 must have a substantially symmetrical design so that the air bag thereof will deploy with a known configuration no matter the orientation of the air bag assembly 22 at the time of deployment.

Furthermore, it is not desirable to mount driver controls and displays on the mounting frame 20 since the mounting frame 20 rotates with the steering wheel 12.

SUMMARY

The present invention relates to a steering wheel mounting assembly. The assembly comprises a stationary support carrier defining first and second ring receiving areas and adapted to be fixed to a vehicle frame. A first drive ring having a first cylindrical raceway is supported in the first ring receiving area and is adapted for connection to a steering wheel. A second drive ring having a second cylindrical raceway is positioned in the second ring receiving area and is adapted for connection to a steering shaft. The second cylindrical raceway is concentric with the first cylindrical raceway. A drive roller assembly is supported within the first and second cylindrical raceways. The drive roller assembly comprises first and second roller planets, each roller planet having raceways configured to engage the first and second cylindrical raceways. A sun roller is supported in frictional engagement with the first and second roller planets. The sun roller is eccentric to the first and second cylindrical raceways. A first loading planet is frictionally positioned between the sun roller and the first cylindrical raceway, and a second loading planet is frictionally positioned between the sun roller and the second cylindrical raceway.

BRIEF DESCRIPTION OF THE DRAWINGS

FIG. 5 is a cross sectional view along the line 5-5 in FIG. 4;

FIG. 6 is a cross sectional view along the line 6-6 in FIG. 4;

DETAILED DESCRIPTION

Figure 1:
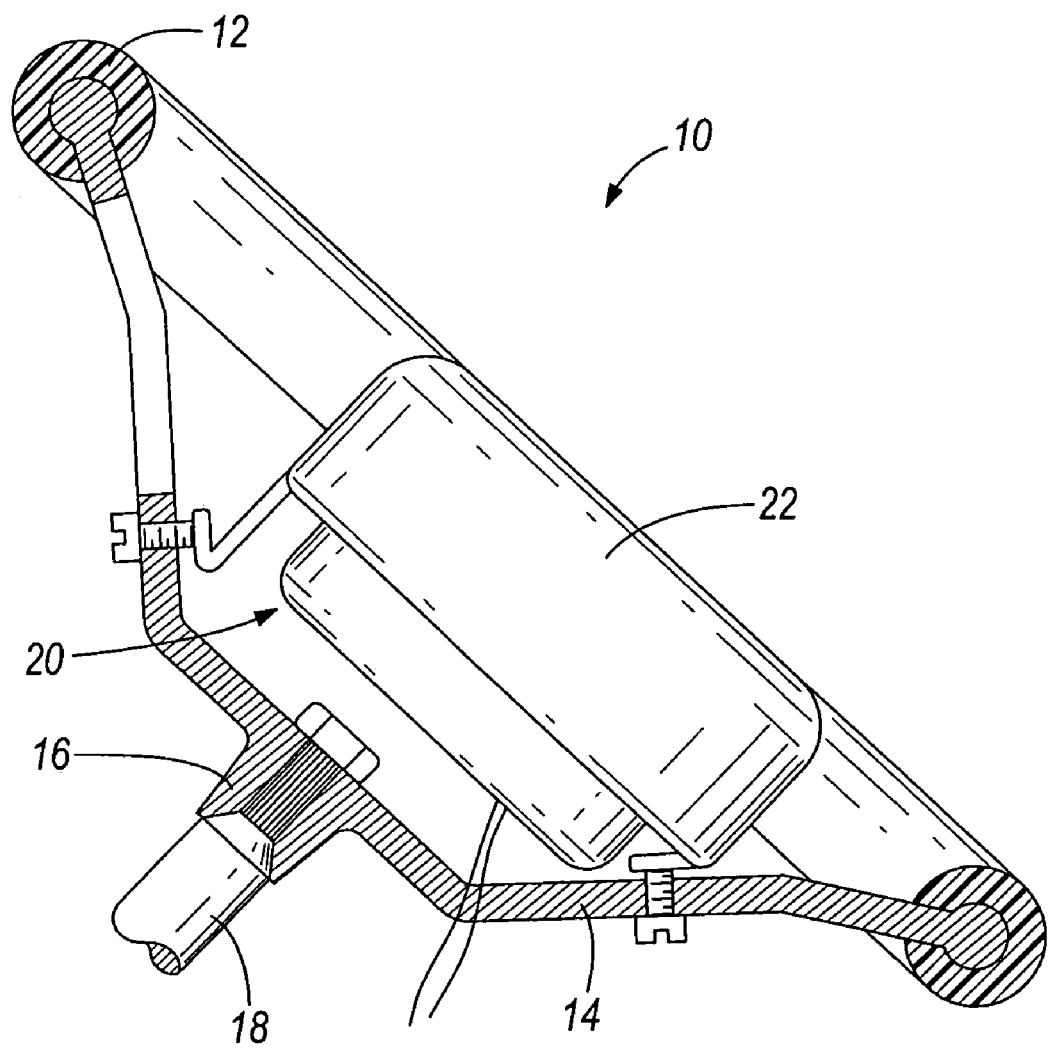
FIG. 1 is a side elevation of a prior art steering assembly in partial cross section.

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Referring to FIGS. 2-6, a mounting assembly 50 that is a first embodiment of the present invention is shown. The mounting assembly 50 generally comprises a stationary support carrier 60, a first drive ring 100, a second drive ring 120 and a drive roller assembly 140. The stationary support carrier 60 is configured for mounting to the vehicle frame (not shown). The first and second drive rings 100 and 120 are mounted within the stationary support carrier 60. The drive roller assembly 140 provides rotational torque between the first drive ring 100 and the second drive ring 120 such that rotation of a steering wheel (not shown) attached to the first drive ring 100 would cause rotation of a steering shaft (not shown) attached to the second drive ring 120. Cover plates 170, 170' are provided to secure the drive roller assembly 140 within the stationary support carrier 60. The front cover plate 170 is provided with means for supporting desired components, for example, an air bag assembly or driver controls and displays. In one embodiment, a wire tube 190 is provided to provide a wire passage from the stationary support carrier 60 through the front cover plate 170.

Figure 2:
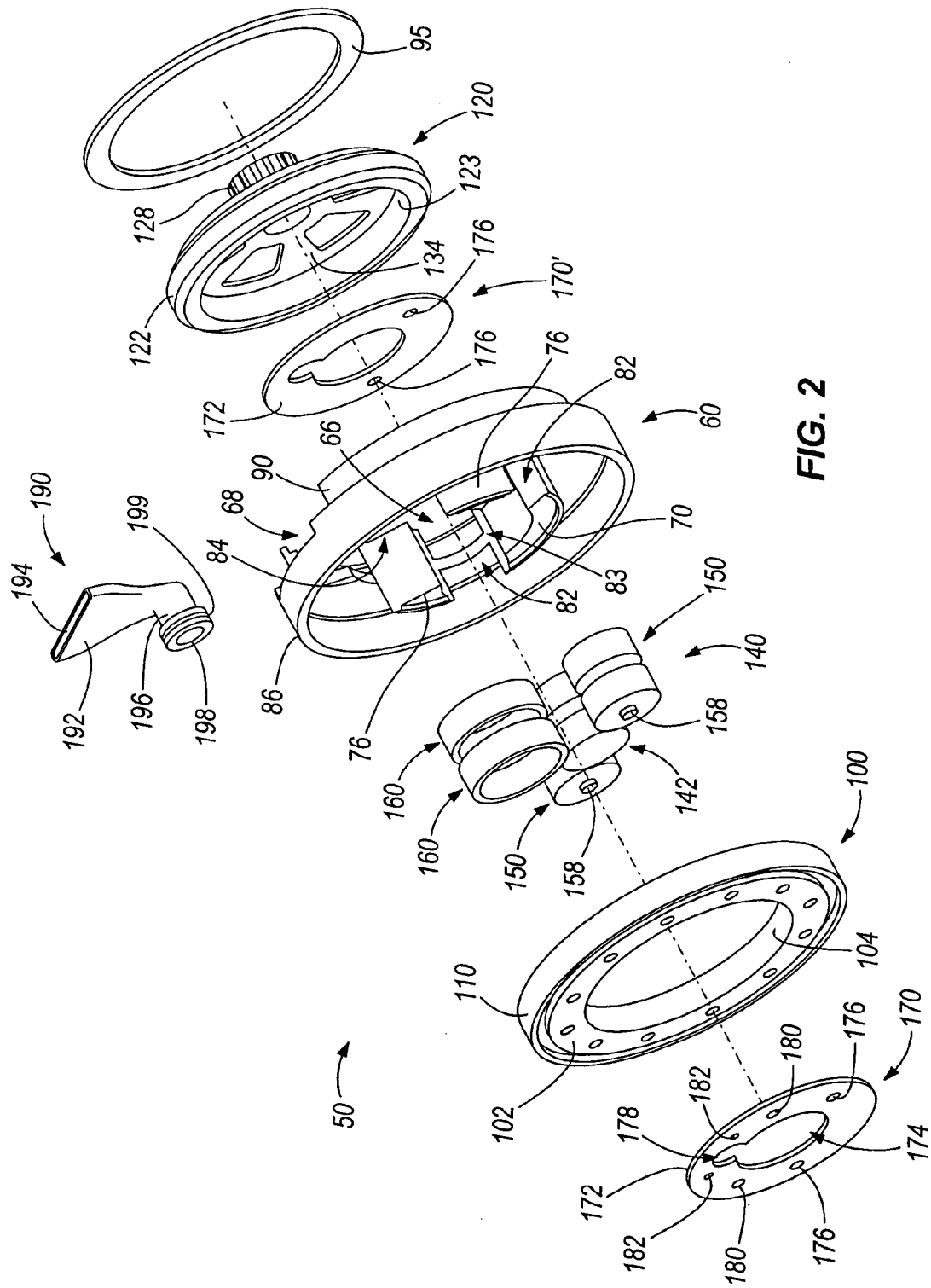
FIG. 2 is an exploded, isometric view of a mounting assembly that is a first embodiment of the present invention.
Figure 4:
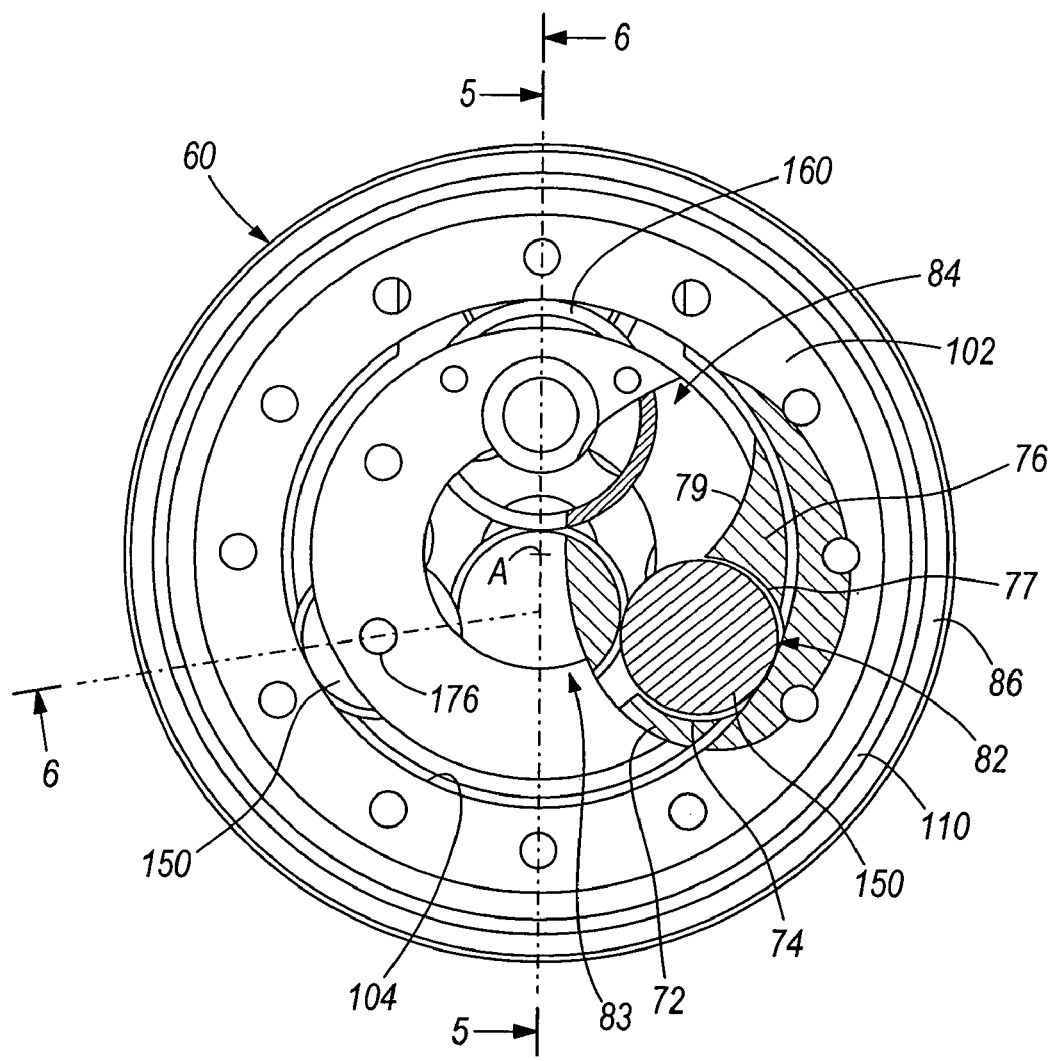
FIG. 4 is a front elevation view, in partial section, of the assembled mounting assembly of FIG. 2.
Figure 7:
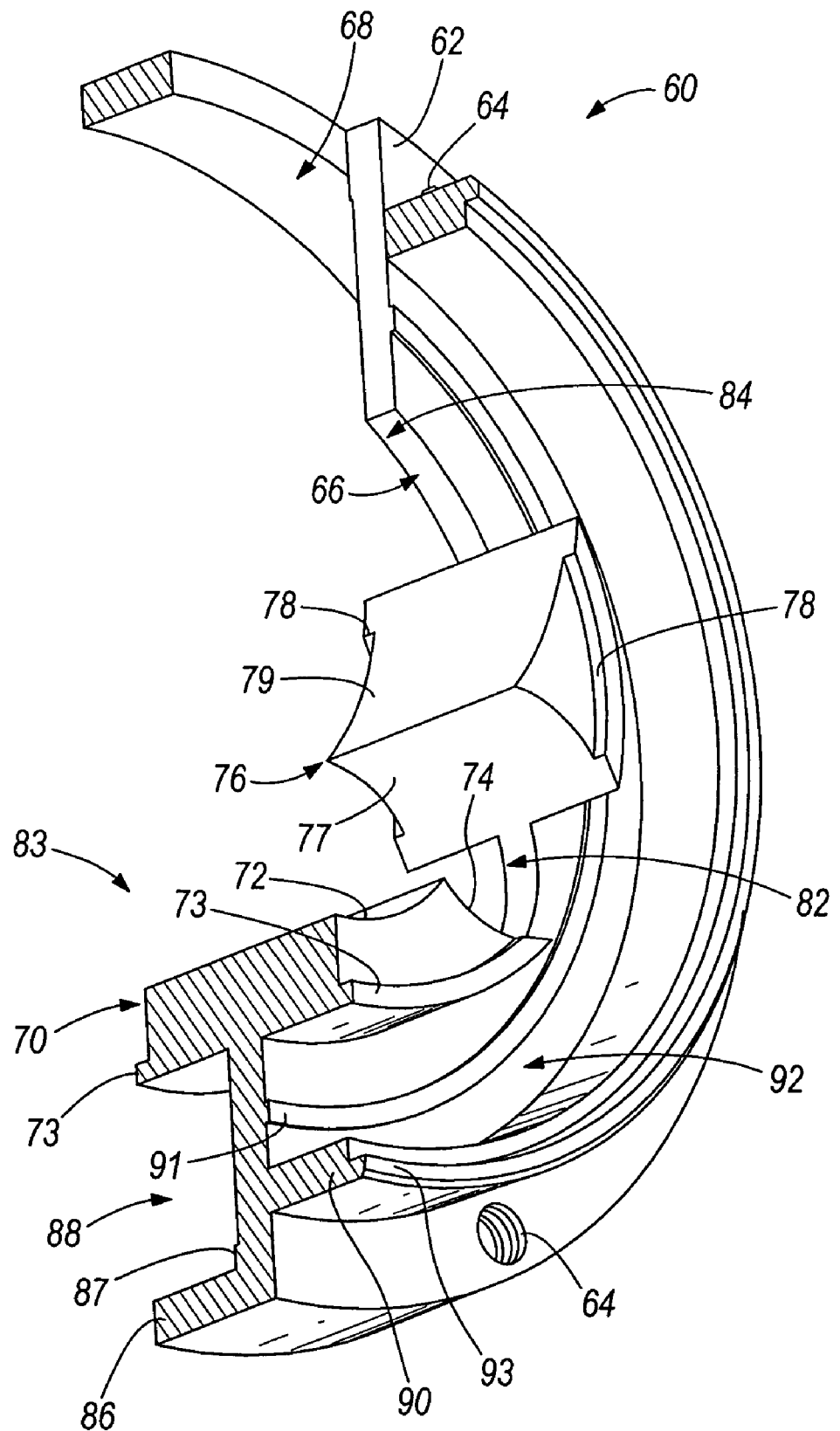
FIG. 7 is an isometric view, in section, of the stationary support carrier of the present embodiment of the invention.

An exemplary stationary support carrier 60 will be described with reference to FIGS. 2, 4 and 7. The stationary support carrier 60 has a radial plate 62. The radial plate 62 is provided with a plurality of threaded holes 64 for fastening the stationary support carrier 60 to the vehicle frame (not shown). The radial plate 62 is provided with a central opening 66 for receiving the drive roller assembly 140. Three supporting columns, a lower column 70 and two side columns 76 and 76, are attached to the radial plate 62 within the central opening 66. Each of the supporting columns 70, 76, 76 has an axial width approximately equal to the width of the drive roller assembly 140 elements. The lower column 70 has a concave radially inner surface 72. An open space 83 for the sun roller 142 is defined above the concave surface 72. As shown in FIG. 4, the sun roller 142 is positioned in the open space 83 such that the sun roller 142 is eccentric to the axis A of the stationary support carrier 60 and the first and second drive rings 100, 120.

Each side surface 74 of the lower column 70 is also concave. Each lower column side surface 74 is opposed by a concave side surface 77 of a respective side column 76. Each set of opposed side surfaces 74, 77 defines a respective open space 82 configured to receive a respective one of the planet rollers 150. The two side columns 76 have opposed concave surfaces 79 that define an open area 84 configured to receive the loading planets 160. As shown in FIG. 4, the open space 84 is larger than the diameter of the loading planets 160 such that the loading planets 160 can move within the open area 84 as will be described hereinafter. As shown in FIG. 7, the lower column 70 and side columns 76 each have annular steps 73 and 78, respectively, configured to position and support the cover plates 170, 170' as will be described hereinafter.

The stationary support carrier 60 has a first annular wall 86 extending from the radial plate 62 to define an area 88 for receiving the first drive ring 100. An annular step 87 at the conjunction of the radial plate 62 and the first annular wall 86 defines the axial position of the first drive ring 100 within area 88. Once the first drive ring 100 is positioned within area 88, it is further secured in the axial direction by a snap ring (not shown) or by roll forming the free end of the annular wall 86, for example.

The stationary support carrier 60 has a second annular wall 90 extending from the other side of the radial plate 62 to define an area 92 for receiving the second drive ring 120. An annular thrust bearing surface 91 is provided on the radial plate 62 to axially position the second drive ring 120 within the area 92. An annular step 93 at the end of the wall 90 is configured to receive a thrust ring 95, see FIG. 3, to confine the axial position of the second drive ring 120 within the area 92.

Figure 3:
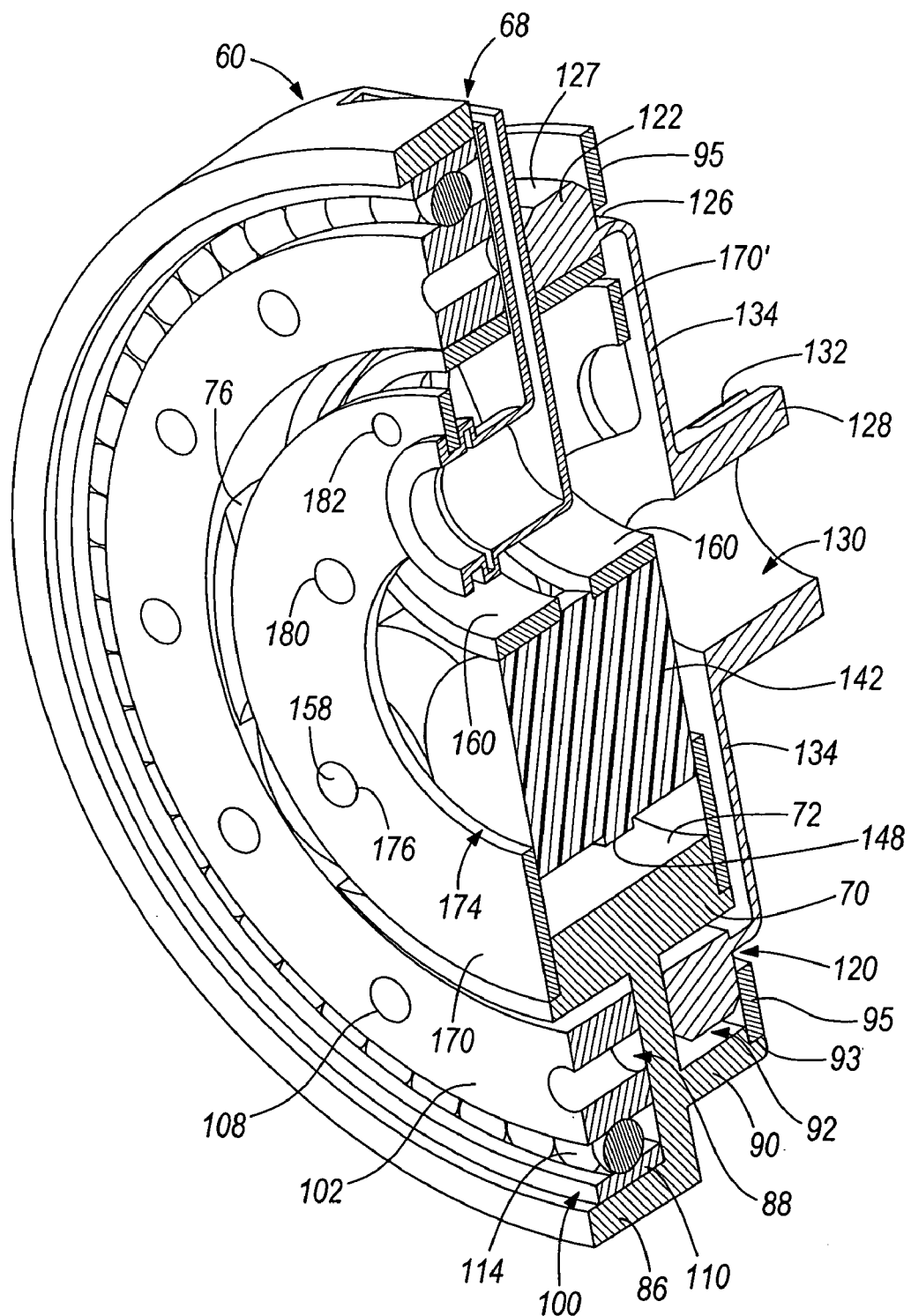
FIG. 3 is an assembled, isometric view of the mounting assembly of FIG. 2 in cross section.
Figure 8:
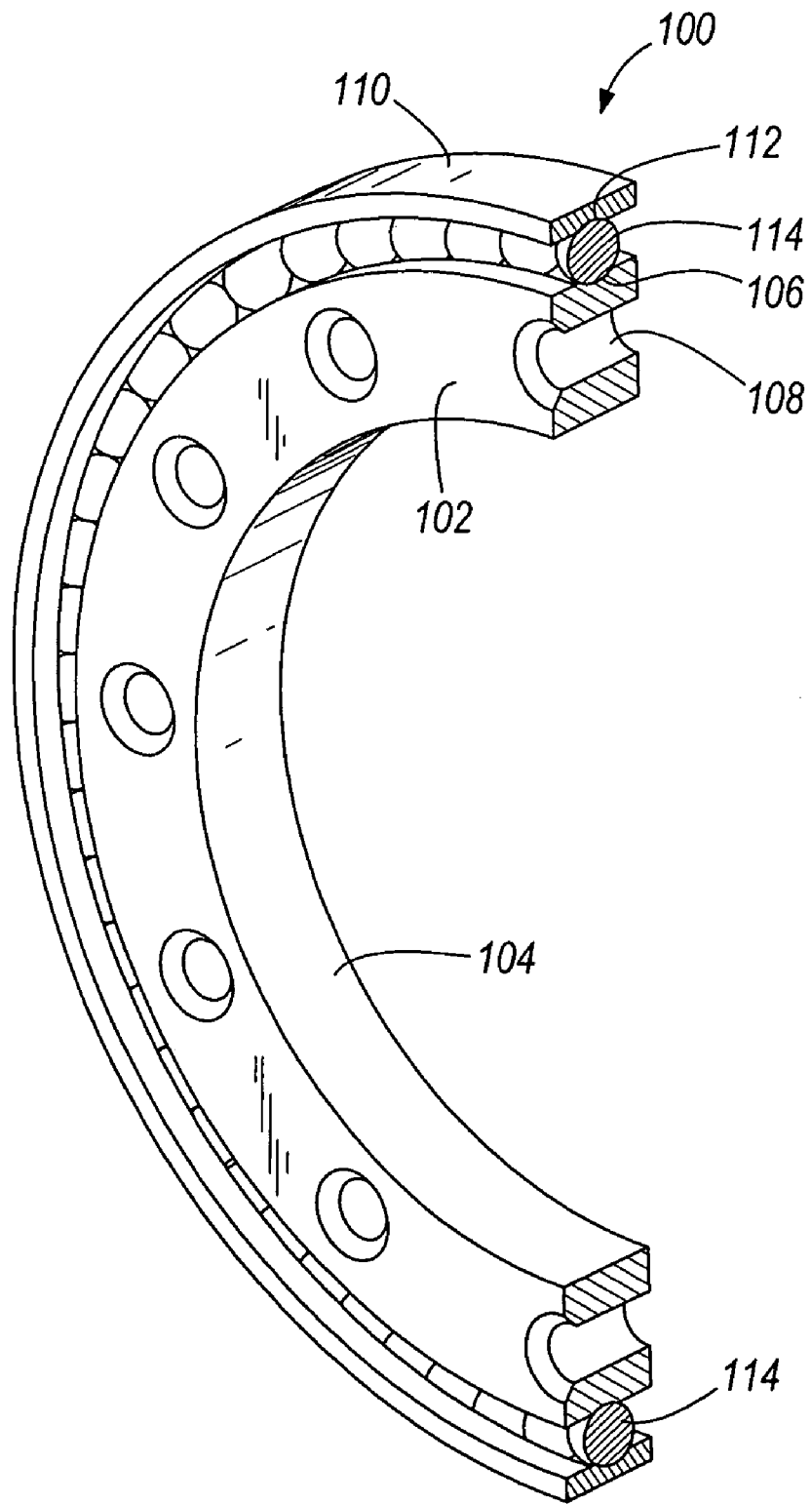
FIG. 8 is an isometric view, in section, of the first drive ring of the present embodiment of the invention.

Referring to FIG. 8, an exemplary first drive ring 100 is shown. The first drive ring 100 includes an inner race ring 102, a set of rolling elements 114 and an outer race ring 110. The bore of the inner race ring 102 defines the cylindrical raceway 104 of the first drive ring 100. There are through holes 108 on the body of the inner race ring 102 for connection with the steering wheel (not shown). The outer surface of the inner race ring 102 is provided with a rolling element raceway 106, and the inner surface of the outer race ring 110 is provided with a rolling element raceway 112. In the illustrated embodiment, the rolling elements 114 are balls and each of the raceways 106, 112 is a circumferential groove configured to receive the balls. Other rolling elements and corresponding raceways may also be utilized. As shown in FIGS. 3 and 5-6, the first drive ring 100 is positioned in the area 88 with the outer race ring 110 supported by the first annular wall 86. The rolling elements 114 allow the inner race ring 102, and the interconnected steering wheel (not shown), to rotate freely relative to the outer race ring 110 and thereby the stationary support carrier 60.

Figure 9:
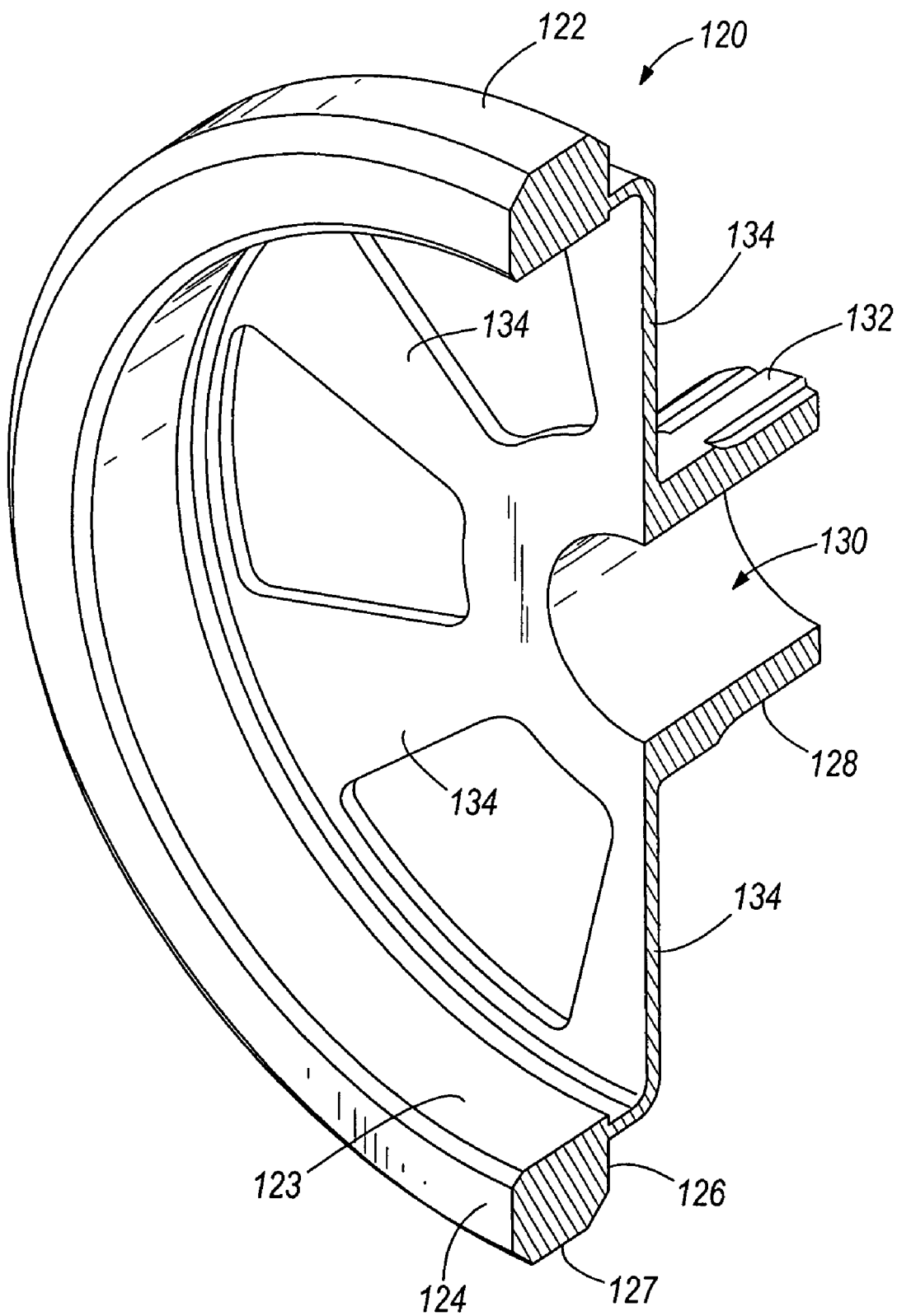
FIG. 9 is an isometric view, in section, of the second drive ring of the present embodiment of the invention.

Referring to FIG. 9, an exemplary second drive ring 120 is illustrated. The second drive ring 120 has an annular body 122. The bore of the annular body 122 defines the cylindrical raceway 123 of the second drive ring 120. The second drive ring 120 is radially supported and positioned by the engagement of the cylindrical raceway 123 with the drive roller assembly 140 as will be described hereinafter. The annular body 122 has two planar surfaces 124 and 126 for axial thrust bearing surfaces. Radially outer surface 127 extending between the planar surfaces 124 and 126 is configured to be spaced from the inner surface of the second annular wall 90 of the stationary support carrier 60 when the second drive ring 120 is positioned within the area 92.

A shaft connector 128 is connected to the annular body 122 through a set of spokes 134. The shaft connector 128 is provided with a through hole 130, see FIG. 3, and splines or keyways 132 for facilitating connection of a steering shaft or the like to the shaft connector 128. Other connection arrangements may also be provided.

Figure 10:
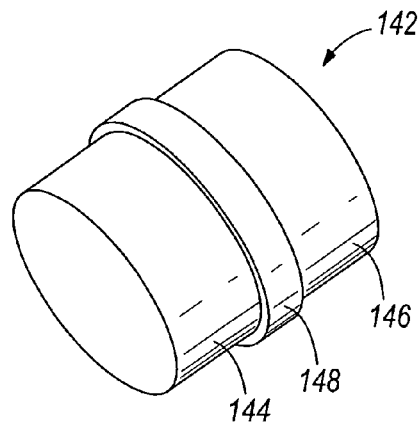
FIG. 10 is an isometric view of the sun roller of the present embodiment of the invention.
Figure 11:
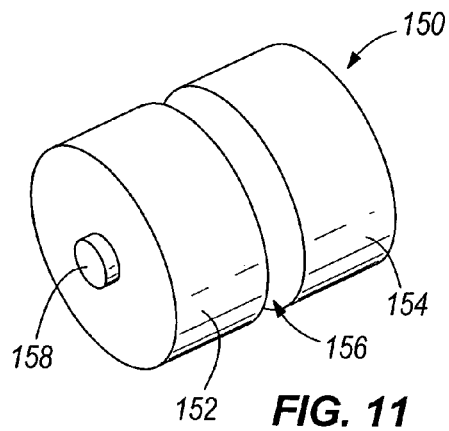
FIG. 11 is an isometric view of one of the planet rollers of the present embodiment of the invention.

An exemplary drive roller assembly 140 will be described with reference to FIGS. 2-4 and 10-13. The drive roller assembly 140 generally comprises a sun roller 142, a pair of planet rollers 150 and a pair of loading planets 160. Referring to FIG. 10, an exemplary sun roller 142 has two cylindrical raceways 144 and 146 that are separated by a rib 148. Referring to FIG. 11, exemplary planet rollers 150 each have two cylindrical raceways 152 and 154 separated by a recess 156. At each end surface, there is a journal shaft 158 that lies in the same axis as the raceways 152 and 154. By providing two raceways 144, 146 and 152, 154 on each of the sun and planet rollers 142, 150, the two drive rings 100, 120 are compounded, having at least one common planet or sun roller, to communicate rotational movement and transfer torque from one ring member 100 to the other ring member 120. While the sun roller 142 can be formed as a unitary component with a pair of raceways 144, 146, and the planet rollers 150 can be formed as unitary components with pairs of raceways 152, 154, it is possible to make one or two of these components as separated components with separate raceways. In an exemplary implementation, the sun roller 142 and planet rollers 150 are manufactured from a rigid material.

Figure 12:
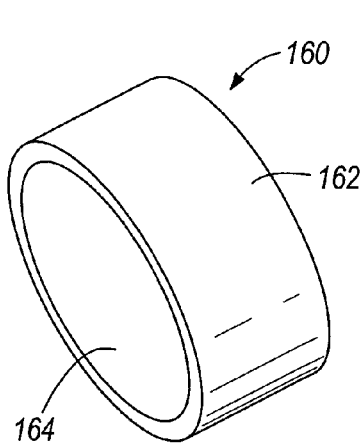
FIG. 12 is an isometric view of one of the loading planets of the present embodiment of the invention.

Referring to FIG. 12, each loading planet 160 has a cylindrical body 162 with an opening 164 therethrough. Each loading planet body 162 is flexible relative to the planet rollers 150 and the sun roller 142. The loading planets 160 deform in a diametric direction when assembled between the first and second drive rings 100, 120 and the sun roller 142. This provides a preload that pushes the sun roller 142 downward as will be described hereinafter.

Figure 13:
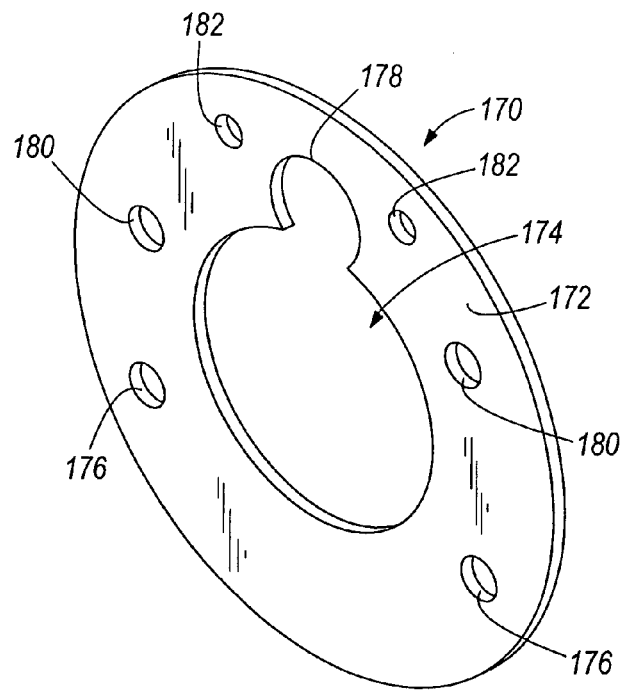
FIG. 13 is an isometric view of one of the cover plates of the present embodiment of the invention.

Referring to FIGS. 2-5 and 13, the sun roller 142, planet rollers 150 and the loading rollers 160 are retained axially within the stationary support carrier 60 by attachment of cover plates 170, 170' to the supporting columns 70, 76, 76. Each cover plate 170, 170' is provided with two bearing sleeves 176 configured to respectively receive the journal shaft 158 extending from the planet rollers 150. As shown in FIG. 13, the front cover plate 170 is provided with mounting features, for example, connection holes 180, 182, for mounting an air bag assembly, instrument panels or displays. The front cover plate 170 is also provided with a primary through hole 174 and a secondary through hole 178. The secondary through hole 178 is configured to receive and support a portion of the wire tube 190 as will be described hereinafter. The rear cover plate 170' can be formed in the same configuration as the front cover plate 170 to minimize manufacturing. However, the rear cover plate 170' can be formed without mounting features and the secondary through hole 178.

Referring to FIGS. 4-6, the drive roller assembly 140 is positioned in the stationary support carrier 60 with the sun planet 142 in opening 83, the roller planets 150 in respective openings 82, and the loading planets 160 positioned in the opening 84. The roller planets 150 are supported by the first and second drive rings 100 and 120 with the first raceways 152 bearing on the first drive ring cylindrical raceway 104 and the second raceways 154 bearing on the second drive ring cylindrical raceway 123. Each journal shaft 158 is received in and supported by a respective bearing sleeve 176.

The sun roller 142 is supported between and in frictional contact with the two roller planets 150. The sun roller rib 148 is received in each planet roller recess 156 to maintain the sun roller 142 axially aligned with the planet rollers 150. The planet roller raceways 152 bear against the sun roller raceway 144 and the planet roller raceways 154 bear against the sun roller raceway 146. The sun roller 142 is supported below the axis A of the stationary support carrier 60 and first and second drive rings 100, 120 such that the sun roller 142 is eccentric to the first and second drive rings 100, 120.

One of the loading planets 160 is positioned between sun roller raceway 144 and the first drive ring cylindrical raceway 104 and a second of the loading planets 160 is positioned between the sun roller raceway 146 and the second drive ring cylindrical raceway 123. In an exemplary construction, the loading planets 160 have a diameter greater than the respective distances between the sun raceways 144 and 146 and the ring drive raceways 104 and 123 such that the loading planets 160 provide a preload on the sun roller 142. The sun roller rib 148 axially positions the loading planets 160 as shown in FIG. 4.

A wire passage is provided by the wire tube 190 as shown in FIGS. 2-3 and 5-6. The wire tube 190 has a radial portion 192 that provides a radial passage 194 and an axial portion 196 that provides an axial passage 198 interconnected with the radial passage 194. The axial portion 196 is provided with a mounting recess 199 configured to snap on to the secondary through hole 178 of the cover plate 170. The axial portion 196 extends through the opening 164 of one of the loading rollers 160 and the radial portion 192 extends between an axial gap between the two loading rollers 160 and through an opening 68 cut in the stationary supporting carrier 60.

Figure 14:
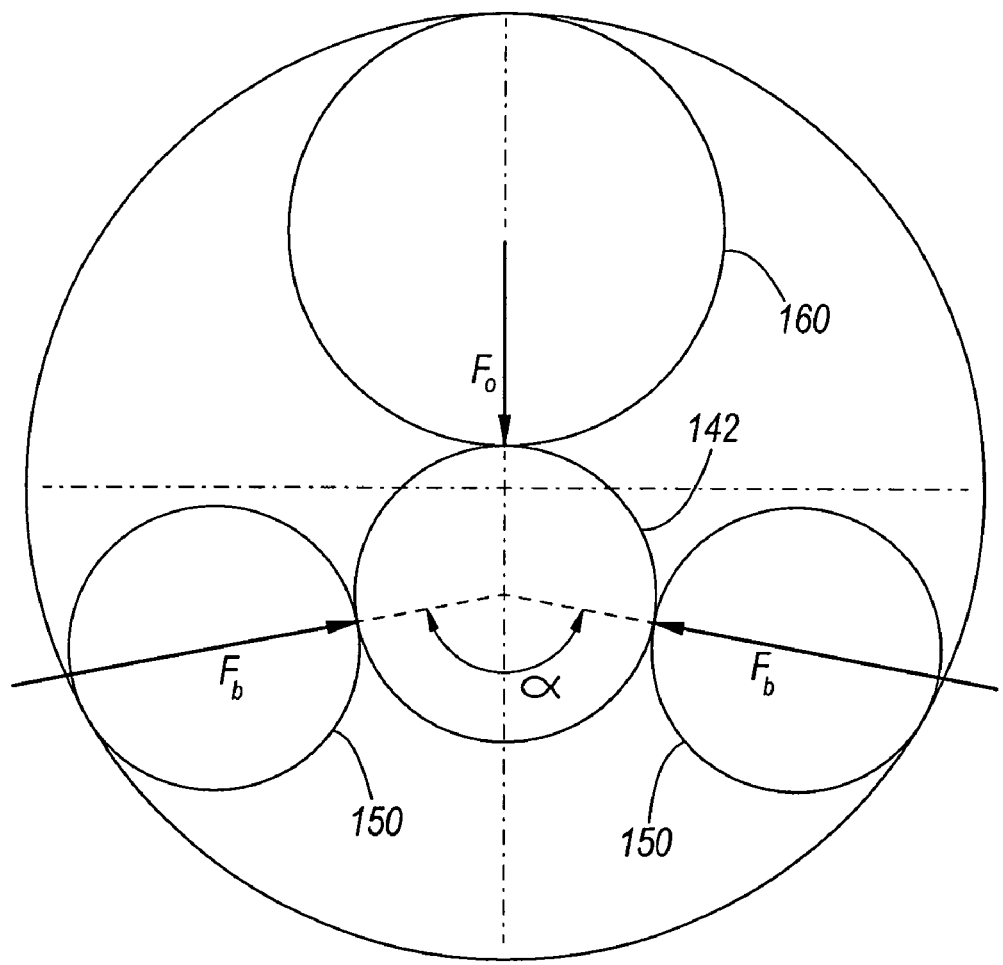
FIG. 14 is a schematic view illustrating the relationship of the sun roller, the planet rollers and the loading planets.

Having described the components of the mounting assembly 50 according to an embodiment of the present invention, its operation will now be described with reference to FIGS. 4 and 14. The roller planets 150 back up the sun roller 142. The downward force $F_0$ (loading force) from the loading planets 160 on the sun roller 142 is balanced by the backing forces $F_b$ from the roller planets 150 as shown in FIG. 14. The angle between the two backing forces, denoted as α, can be designed close to 180 degrees. Thus, a small loading force $F_o$ can result in large backing forces $F_b$ which in turn cause large normal contact force between the roller planets 150 and the drive rings 100, 120. These large normal contact forces provide adequate friction force between the roller planets 150 and the drive ring 100, 120 to ensure torque transfer between the two drive rings 100, 120.

As the operator steers the vehicle, the first drive ring inner race ring 102 turns with the steering wheel (not shown) in the same direction. Contact between the first drive ring inner ring raceway 104 and the roller planet raceways 152 and the loading planet 160 causes the roller planet raceways 152 and the loading planet 160 to rotate in the same direction as the first drive ring inner ring 102. Motion of the first drive ring inner ring 102 pulls the loading planet 160 into a convergent gap formed between the first drive ring inner ring 102 and the sun roller 142. This further increases the loading force $F_0$ for the first drive ring 100. The roller planets 150 consequently drive the sun roller 142 in the opposite direction. As the sun roller 142 rotates, it also pulls the other loading planet 160 into a convergent gap formed between the second drive body 122 and the sun roller 142. This, in a similar way, further increases the loading force $F_o$ for the second drive ring 120. As the roller planets 150 rotate, they drive the second drive ring 120 in the same direction as the planet rollers 150 and the first drive ring inner ring 102. Therefore, the drive roller assembly 140 provides a 1:1 speed ratio between the two ring drives 100 and 120. Any overturning moment on the first drive ring inner ring 102 from the steering wheel is taken directly by the rolling elements 114 to the stationary supporting carrier 60. Co-owned U.S. patent application Ser. No. 10/298,762, filed Nov. 18, 2002 and incorporated herein by reference, further describes an exemplary embodiment of the drive roller assembly 140.

Embodiments of the present invention provide substantially zero backlash at frictional contacts. For example, in implementations described above, there will be substantially no lash between the first drive ring 100 connected to a steering wheel and the second drive ring 120 connected to the steering shaft. Furthermore, the drive roller assembly 140 is smooth and quiet in operation. In general, embodiments of the friction drive disclosed herein eliminate the lash and variation in torque typically experienced during operation of gear-driven steering systems. Moreover, it can be appreciated that embodiments enable the integration of shaped airbags to improve vehicle safety, as well as the placing of vehicle gage(s), controls, and/or LCD display(s) in the center of the steering wheel without the need for clock springs.

The embodiments described above are merely exemplary embodiments, and other embodiments can be practiced that fall within the scope of embodiments of the invention.

What is claimed is:

1. A steering wheel mounting assembly comprising:
   a stationary support carrier defining first and second ring receiving areas and being constructed and arranged to be fixed to a vehicle frame;
   a first drive ring having a first cylindrical raceway and being supported in the first ring receiving area and constructed and arranged for connection to a steering wheel;
   a second drive ring having a second cylindrical raceway and being positioned in the second ring receiving area and constructed and arranged for connection to a steering shaft, the second cylindrical raceway being concentric with the first cylindrical raceway; and
   a drive roller assembly supported within the first and second cylindrical raceways, the drive roller assembly comprising:
      first and second roller planets, each roller planet having raceways configured to engage the first and second cylindrical raceways;
      a sun roller supported in frictional engagement with the first and second roller planets, the sun roller being eccentric to the first and second cylindrical raceways;
      a first loading planet frictionally positioned between the sun roller and the first cylindrical raceway; and
      a second loading planet frictionally positioned between the sun roller and the second cylindrical raceway.

2. The steering wheel mounting assembly of claim 1, further comprising a cover plate constructed and arranged to secure the drive roller assembly within the stationary support carrier.

3. The steering wheel mounting assembly of claim 2, wherein the cover plate comprises means for supporting at least one vehicle component.

4. The steering wheel mounting assembly of claim 3, wherein the supporting means comprise at least one connection hole.

5. A steering wheel mounting assembly, comprising:
   a first drive ring member constructed and arranged to be mounted to a steering wheel;
   a second drive ring member constructed and arranged to be mounted to a steering shaft;
   a stationary support member constructed and arranged to receive the first and second drive ring members such that at least one component of the first drive ring member and at least one component of the second drive ring member are respectively free to rotate relative to the stationary support member; and a drive roller assembly receivable by the stationary support member and comprising a plurality of rotatable elements, at least one of the rotatable elements being constructed and arranged to be in frictional contact with a portion of the first drive ring member and a portion of the second drive ring member, wherein, in use, at least one of the rotatable elements is constructed and arranged to transfer rotational motion and torque between the first drive ring member and the second drive ring member.

6. The steering wheel mounting assembly of claim 5, wherein, in use, the drive roller assembly is constructed and arranged to substantially provide a 1:1 speed ratio between the first drive ring member and the second drive ring member.

7. The steering wheel mounting assembly of claim 5, wherein, in use, substantially zero backlash is produced at frictional contacts within the steering wheel mounting assembly.

8. The steering wheel mounting assembly of claim 5, wherein the rotatable elements comprise at least one roller planet, sun roller, and loading planet.

9. The steering wheel mounting assembly of claim 5, wherein the first drive ring member comprises a first drive ring having a first cylindrical raceway, and the second drive ring member comprises a second drive ring having a second cylindrical raceway.

10. The steering wheel mounting assembly of claim 9, wherein the rotatable elements comprise:

first and second roller planets, each roller planet having raceways configured to engage the first and second cylindrical raceways;

a sun roller supported in frictional engagement with the first and second roller planets, the sun roller being eccentric to the first and second cylindrical raceways;

a first loading planet frictionally positioned between the sun roller and the first cylindrical raceway; and a second loading planet frictionally positioned between the sun roller and the second cylindrical raceway.

11. The steering wheel mounting assembly of claim 10, wherein the first and second loading planets are constructed and arranged to provide a preload on the sun roller.

12. The steering wheel mounting assembly of claim 5, further comprising means for securing the drive roller assembly within the stationary support member.

13. The steering wheel mounting assembly of claim 12, wherein the securing means comprise means for supporting a vehicle component.

14. The steering wheel mounting assembly of claim 13, wherein the vehicle component comprises an air bag assembly.

15. The steering wheel mounting assembly of claim 12, wherein the securing means comprise a plate member.

16. The steering wheel mounting assembly of claim 15, further comprising a tube member constructed and arranged to convey wires to the plate member.

17. The steering wheel mounting assembly of claim 5, wherein the first drive ring member comprises an inner race ring, an outer race ring, and rolling elements constructed and arranged to allow the inner race ring, in use, to rotate freely with respect to the outer race ring.

18. The steering wheel mounting assembly of claim 5, wherein the second drive ring member comprises an annular body and a shaft connector connected to the annular body.

19. A method of transmitting rotational motion and torque, comprising:

mounting a first drive ring member to a steering wheel;

mounting a second drive ring member to a steering shaft;

installing the first and second drive ring members in a stationary support member such that at least one component of the first drive ring member and at least one component of the second drive ring member are respectively free to rotate relative to the stationary support member; and installing a plurality of rotatable elements in the stationary support member such that at least one of the installed rotatable elements is in frictional contact with a portion of the first drive ring member and a portion of the second drive ring member, and such that, in use, rotational motion and torque are transferred between the first drive ring member and the second drive ring member.

20. The method of claim 19, further comprising:

installing a plate member on the stationary support member; and mounting a vehicle component on the plate member.

* * * * *